US 8,485,029 B2

(12) United States Patent
Anders

(10) Patent No.: US 8,485,029 B2
(45) Date of Patent: Jul. 16, 2013

(54) APPARATUS AND METHOD FOR LANDING A ROTARY WING AIRCRAFT

(75) Inventor: John Thomas Anders, Rochester (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 13/243,534

(22) Filed: Sep. 23, 2011

(65) Prior Publication Data

US 2012/0139759 A1    Jun. 7, 2012

Related U.S. Application Data

(62) Division of application No. 12/304,647, filed as application No. PCT/GB2008/051065 on Nov. 14, 2008, now Pat. No. 8,286,477.

(30) Foreign Application Priority Data

Dec. 21, 2007 (EP) ...................................... 07255029
Dec. 21, 2007 (GB) .................................. 0725091.3

(51) Int. Cl.
*G01C 21/00* (2006.01)
*G01C 17/00* (2006.01)

(52) U.S. Cl.
USPC ............... 73/178 R; 73/187; 73/178 H; 345/8

(58) Field of Classification Search
None
See application file for complete search history.

(56) References Cited

U.S. PATENT DOCUMENTS

| | | | |
|---|---|---|---|
| 6,052,069 A | | 4/2000 | Silder, Jr. et al. |
| 2005/0206533 A1 | | 9/2005 | Rogers et al. |
| 2006/0055628 A1 | * | 3/2006 | Sanders-Reed et al. .......... 345/8 |
| 2006/0238377 A1 | | 10/2006 | Stiles et al. |
| 2008/0262664 A1 | * | 10/2008 | Schnell et al. .................... 701/4 |
| 2009/0294573 A1 | * | 12/2009 | Wilson et al. ...................... 244/2 |
| 2011/0254707 A1 | * | 10/2011 | Landragin et al. ............. 340/979 |
| 2012/0029869 A1 | * | 2/2012 | Muensterer et al. .......... 702/155 |
| 2012/0249592 A1 | * | 10/2012 | Sanders-Reed et al. ...... 345/633 |

OTHER PUBLICATIONS

European Search Report dated Jun. 18, 2008.
Notification of Transmittal of the International Search Report and the Written Opinion of the International Searching Authority Forms (PCT/ISA/220, PCT/ISA/210 and PCT/ISA/237) issued in corresponding International Application No. PCT/GB2008/051065 dated Jun. 30, 2009.
Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/GB2008/051065 dated Jul. 1, 2010.

* cited by examiner

*Primary Examiner* — Andre Allen
(74) *Attorney, Agent, or Firm* — Buchanan Ingersoll & Rooney

(57) ABSTRACT

An aircraft 160 approaches a landing point 162 following a flight path 164 to a designation point 166, the pilot sights the landing point 162 and activates the apparatus. A first calculation of coordinates for the landing point 162 is made and landing symbology generated. The pilot reviews the landing symbology and decides whether or not there is an acceptable correlation with the landing point 162. If not, the pilot will continue along the flight path 164 activating the apparatus at further designation points 168, 170 and 172 to reduce the designation error between the coordinates calculated by the apparatus and the real world landing position 162 observed by the pilot until the pilot is satisfied. At this point the pilot enters a landing phase and the symbology provides the pilot with landing cues even when the helicopter 160 enters a brown out event indicated by cloud 174.

20 Claims, 13 Drawing Sheets

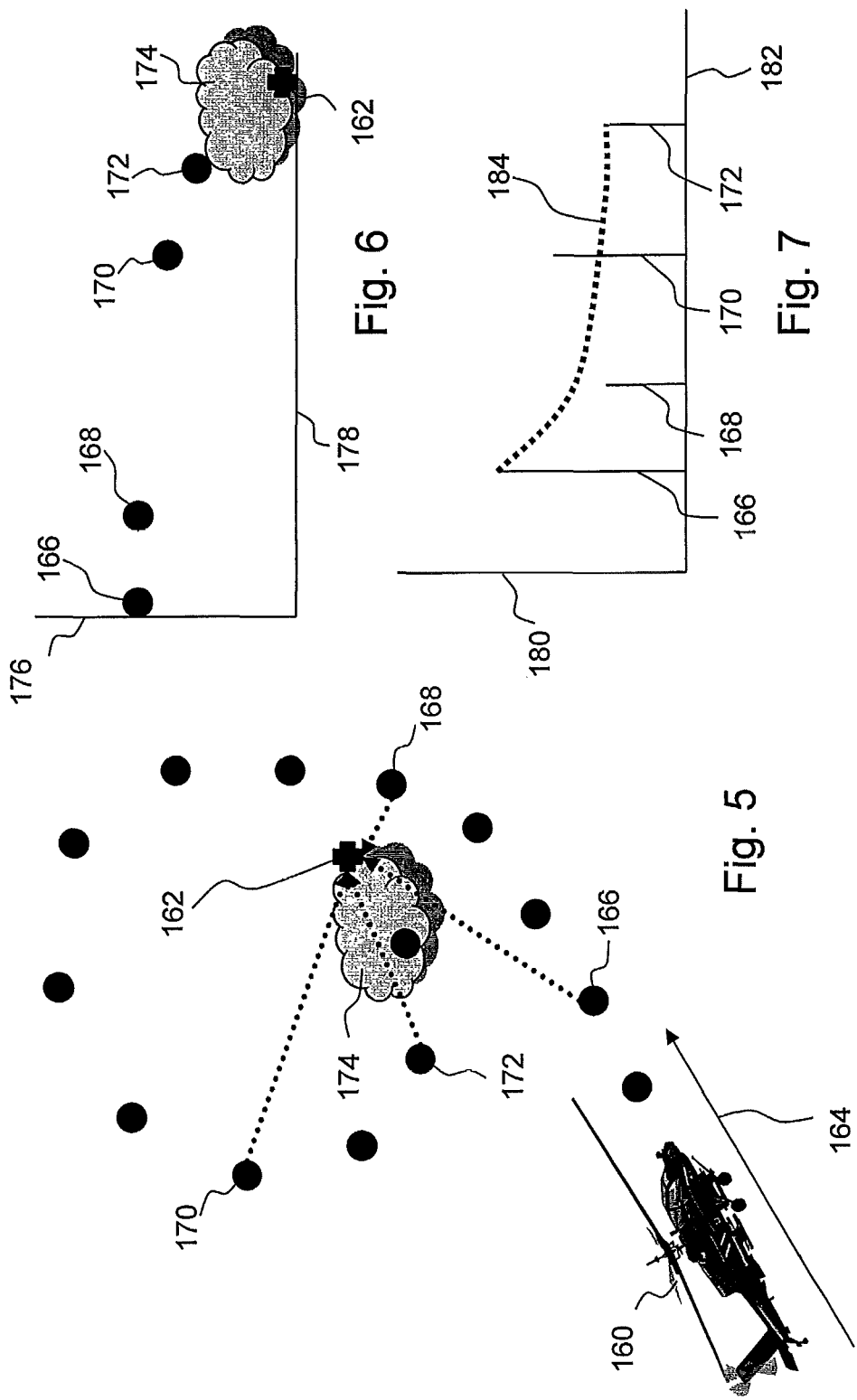

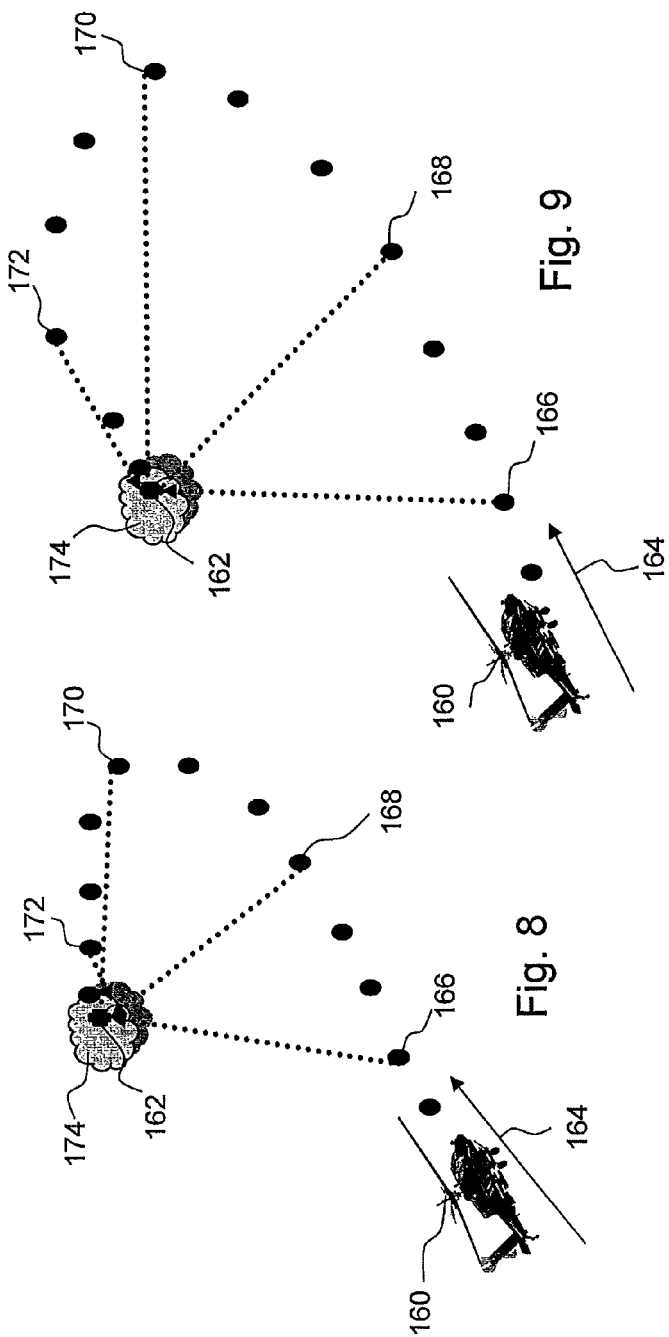
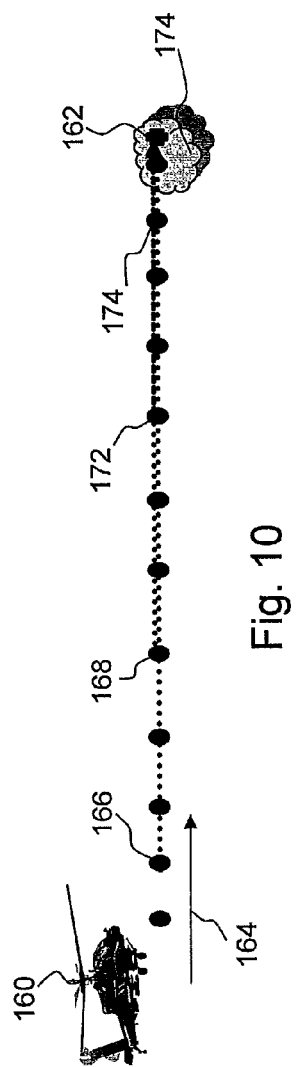

APPARATUS AND METHOD FOR LANDING A ROTARY WING AIRCRAFT

The present invention relates to a method and apparatus for aiding landing of a rotary wing aircraft, in particular, but not exclusively, landing of a rotary wing aircraft in low visibility environments.

A pilot of a rotary wing aircraft flying at a relatively low altitude and at a relatively low forward speed can experience obscured vision due to particles being sucked up from the ground below the aircraft by the horizontal and/or tail rotor(s) of the aircraft. The particles can form a cloud that envelops the aircraft, which will reduce a pilot's visibility, causing loss of external references and sight of obstructions and hence the ability of the pilot to safely control the aircraft and to avoid hazards. This obscuration effect is commonly referred to as "brown out". The condition is most often encountered when the aircraft is operating over terrain which is dry and dusty, for example in desert regions of the world. It also occurs in other areas of the world due to water, ice and/or snow, commonly referred to as "white out" and can occur when water droplets are sucked up from saturated surfaces. Reduced visibility can result in the pilot becoming spatially disorientated and losing situational awareness. Accordingly, the reduced visibility can increase the difficulty in controlling the aircraft during either landing or take-off phases of flight in both day or night conditions. Reduced visibility due to brown out or white out has been directly recognized as the primary cause of a number of accidents, some of which have proved fatal to the aircraft crew.

According to a first aspect of the invention a method for aiding landing of a rotary wing aircraft, wherein a pilot of the rotary wing aircraft is provided with a display arranged to display symbology to the pilot overlaid on a scene viewed by the pilot, includes the steps: A. determining the line of sight of the pilot; B. defining a desired landing point for the rotary wing aircraft dependent on the line of sight of the pilot; C. determining the height of the rotary wing aircraft; D. determining the location of the desired landing point with respect to the rotary wing aircraft; E. generating landing symbology representative of the determined location of the desired landing point; and F. displaying the landing symbology to the pilot on the display.

In this manner, the pilot is presented with landing symbology such that should a low visibility situation occur, the pilot can use the landing symbology to complete the landing or take-off phase of flight for the aircraft.

The method may include repeating steps A to F at different locations of the rotary wing aircraft until there is an acceptable correlation between the generated landing symbology and the desired landing point. Alternatively, the method may include repeating steps A to F at different locations of the rotary wing aircraft until the pilot is satisfied that there is an acceptable visual correlation between the displayed landing symbology and the desired landing point.

The method may include resolving inconsistencies between successively calculated locations of the desired landing point.

The method may include determining the present location of the rotary wing aircraft relative to a universal geographical coordinate scheme. The method may include calculating the location of the desire landing point from the determined present location of the rotary wing aircraft.

The method may include determining the presence of obstacles near the desired landing point using a radar arrangement and displaying detected obstacles to the pilot on the display. The radar may for example be a conventional emitting radar, laser unit used in radar mode, i.e. LADAR, or a passive device reliant upon natural radiation of the obstacles.

The method may include using an inertial navigation apparatus to determine the present location of the rotary wing aircraft and an altimeter to determine the height of the rotary wing aircraft.

The method may include determining the range of the rotary wing aircraft from the desired landing point using a range measurement arrangement. For example a laser. The method may include calculating the closing rate of the rotary wing aircraft with respect to the desired landing point from successive range determinations and displaying the closing rate to the pilot on the display.

The method may include generating a synthetic representation of a scene along the line of sight of the pilot and displaying the synthetic scene to the pilot on the display.

The method may include defining the desired landing point for the rotary wing aircraft by the line of sight of the pilot viewing the desired landing point through a helmet or head mounted display worn by the pilot and tracking of the helmet or head mounted display with a tracker arrangement.

According to another aspect of the invention an apparatus for aiding landing of a rotary wing aircraft, includes: a tracker arrangement arranged to determine the line of sight of a pilot; an activation arrangement arranged to be operable by the pilot so as to initiate capture of a desired landing point for the rotary wing aircraft along the line of sight of the pilot; an altimeter arranged to determine the height of the rotary wing aircraft; a processor arranged to determine the location of the desired landing point with respect to the rotary wing aircraft; wherein the processor is also arranged to generate landing symbology representative of the determined location of the desired landing point; and a display arranged to display generated landing symbology to the pilot overlaid on a scene viewed by the pilot.

The activation arrangement may arranged to be operable by the pilot so as to successively capture a desired landing point for the rotary wing aircraft along the line of sight of the pilot at different locations of the aircraft until there is an acceptable correlation between the displayed landing symbology and the desired landing point.

The processor may also be arranged to resolve inconsistencies between successively calculated locations of the desired landing point.

A navigation arrangement may be arranged to determine the present location of the rotary wing aircraft relative to a universal geographical coordinate scheme. The processor may be arranged to calculate the location of the desired landing point from the determined present location of the rotary wing aircraft.

A radar arrangement may be arranged to determine the presence of obstacles near the desired landing point and detected obstacles may be displayed to the pilot on the display. The display of obstacles may be assisted by setting of audible alarms and alerts depending upon the proximity of the obstacles to the desired landing point. These alarms and alerts could be direction sensitive, using of the head tracker to audibly cue the pilot by sound in the left or right ear to look for the obstacle in the correct direction.

The navigation arrangement may include an inertial navigation apparatus operable to determine the present location of the rotary wing aircraft and an altimeter to determine the height of the rotary wing aircraft.

A range measurement arrangement may be operable to determine the range of the rotary wing aircraft from the desired landing point. For example a laser. The processor may also be arranged to calculate the closing rate of the rotary wing aircraft with respect to the desired landing point from successive range determinations and to display the closing rate to the pilot on the display.

A camera arrangement may be arranged to capture a scene along the line of sight of the pilot, the processor may be arranged to generate a synthetic representation of the captured scene and the display may be arranged to display the synthetic scene to the pilot.

The tracker arrangement may include a helmet or head mounted display arranged to be worn by the pilot and the helmet or head tracker may be arranged to determine the line of sight of the pilot.

The invention will now be described, by way of example only, with reference to the accompanying drawings, in which:

FIG. 5 is schematic illustration, in plan view, of a rotary wing aircraft landing approach and designation of desired landing points according to the invention;

FIG. 6 is a time graph indicating height of the rotary wing aircraft before encountering a brown out condition for the landing and designation of desired landing points illustrated in FIG. 5 according to the invention;

FIG. 7 is a cumulative graph indicating designation error for the designation of desired landing points illustrated in FIG. 5 according to the invention;

FIGS. 8 to 10 are schematic illustrations, in plan view, of alternative rotary wing aircraft landing approaches and designations of desired landing points according to the invention;

Figure 1:
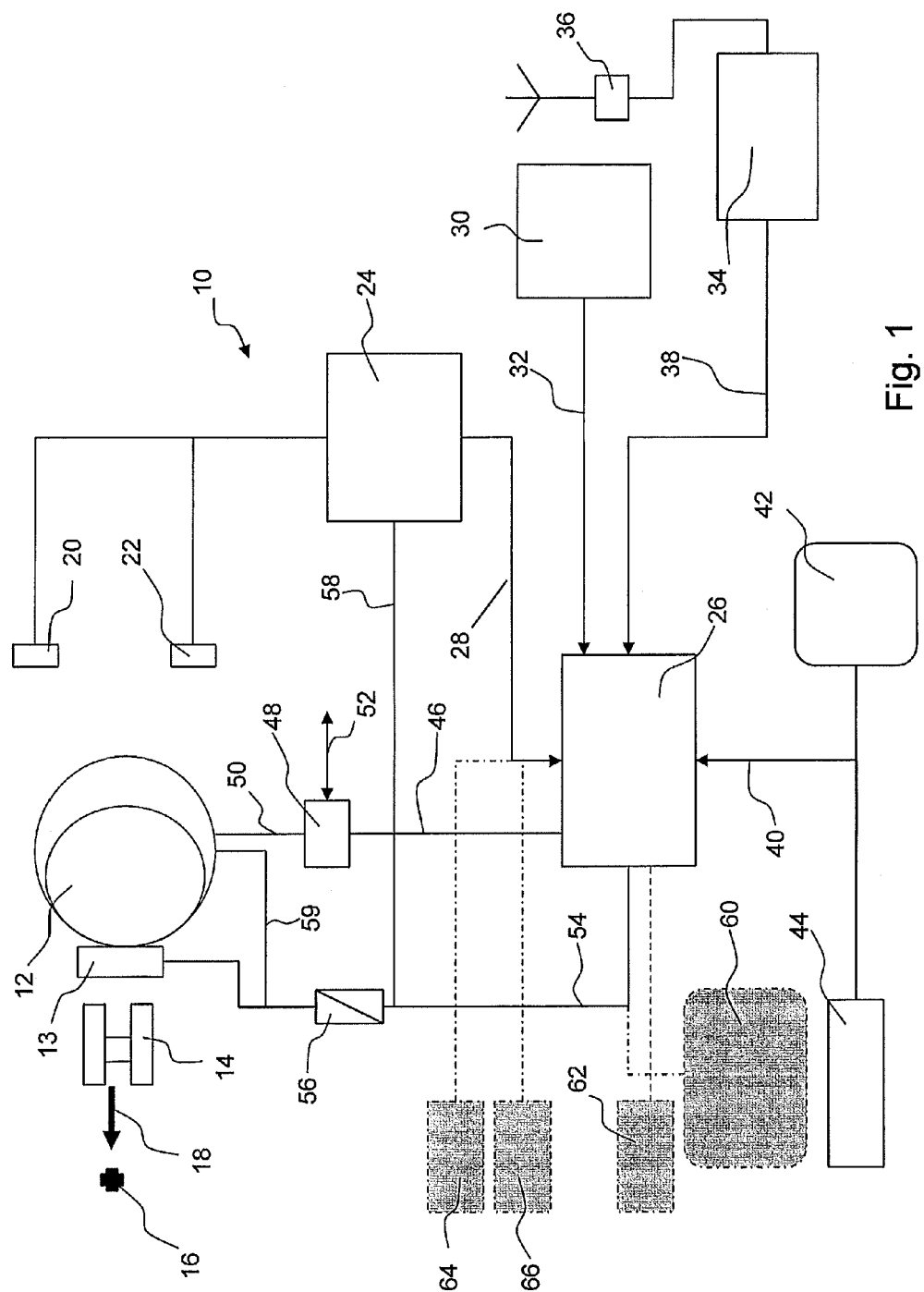
FIG. 1 is a schematic overview of a landing aid apparatus for a rotary wing aircraft according to the invention.

Referring to FIG. 1, a landing aid apparatus 10 for a rotary wing aircraft, for example a helicopter, includes a helmet 12, arranged to carry a helmet mounted display 13 and an image enhanced arrangement, for example a set of night vision goggles 14. A pilot wearing the helmet 12 views a real world scene 16 along a line of sight 18 through a visor of the helmet 12 and through the helmet mounted display 13. If the rotary wing aircraft is operating at night then the night visions goggles 14 are moved to a deployed positioned, as illustrated, such that they coincide with the line of sight 18. Movement of the helmet 12 is tracked using a tracker arrangement including tracker sensors 20 and 22 arranged to feed information to a tracker processor 24, which is arranged to determine the position and orientation of the helmet 12. Tracker data produced by the tracker processor 24 is fed into a processor 26 via input connection 28. The processor 26 calculates the line of sight of the pilot in a suitable earth referenced coordinate frame to provide the pilot with a line of sight cue, via the helmet mounted display 13, concurring with the actual line of sight of the pilot, overlaid on the real world scene 16.

The processor 26 is also arranged to receive flight data from flight instruments 30 to provide flight information, including air speed, radio altimeter, torque status of the aircraft and wind direction via input connection 32.

Furthermore, the processor 26 is also arranged to receive navigation information from the navigation arrangement 34, which can include an inertial navigation system with a global position system input received via a suitable satellite receiver 36. The navigation data from the navigation arrangement 32 is provided to the processor 26 via input connection 38.

The processor 26 is also arranged to receive flight control data over input connection 40 from the aircraft flight control computer 42 and hands on collective and stick (HOCAS) arrangement 44.

The processor 26 is also arranged to output audio signals via output connection 46, which feeds into an aircraft audio interface 48. The aircraft audio interface 48 supplies audio signals from the processor 26 to an earpiece arrangement within the helmet 12 via connection 50. Furthermore, the aircraft audio interface 48 is also arranged to receive aircraft audio signals from other systems via communication link 52 and convey these to the earpiece arrangement of the helmet 12 and to receive signals from a microphone, not illustrated, within the helmet 12 and convey these via communication link 52 to other systems within the aircraft.

Furthermore, landing symbology generated by processor 26 is provided to a Quick Release Connector (QRC) 56 via connection 54 and displayed to the pilot via the helmet mounted display 13 associated with the helmet 12. It will be understood that the pilot will view the generated landing symbology on the helmet mounted display 13 overlaid on the forward scene 16. The forward scene 16 can be enhanced for night operation by deployment of the night vision goggles 14 and generated symbology will appear overlaid onto the night vision goggles enhanced forward scene 16 viewed by the pilot. It will be understood that alternatively a helmet mounted camera, not illustrated, can image the forward scene 16 and provide a video signal to the processor 26 via connection 54 through the QRC 56. The forward scene 16, from such a camera, can be enhanced by the processor 26 to generate a synthetic image that is conveyed to the pilot via the helmet mounted display within the helmet 12 via connection 54.

The tracker processor 24 is also arranged to output tracker drive information via output 58, which is in turn fed to tracker emitter devices on the helmet via QRC 56 and link 59 to provide the tracker emitter devices with control information to aid operation with the associated tracker sensors 20 and 22.

The processor 26 can also optionally supply video signals to a head down display 60 to provide further situational awareness to the pilot, for example a map or photograph of the desired landing point for the aircraft.

Additionally, the processor 26 can also optionally receive further information from a forward looking infrared turret 62, a radar, for example a laser optical detector 64, or a range finder 66.

Figure 2:
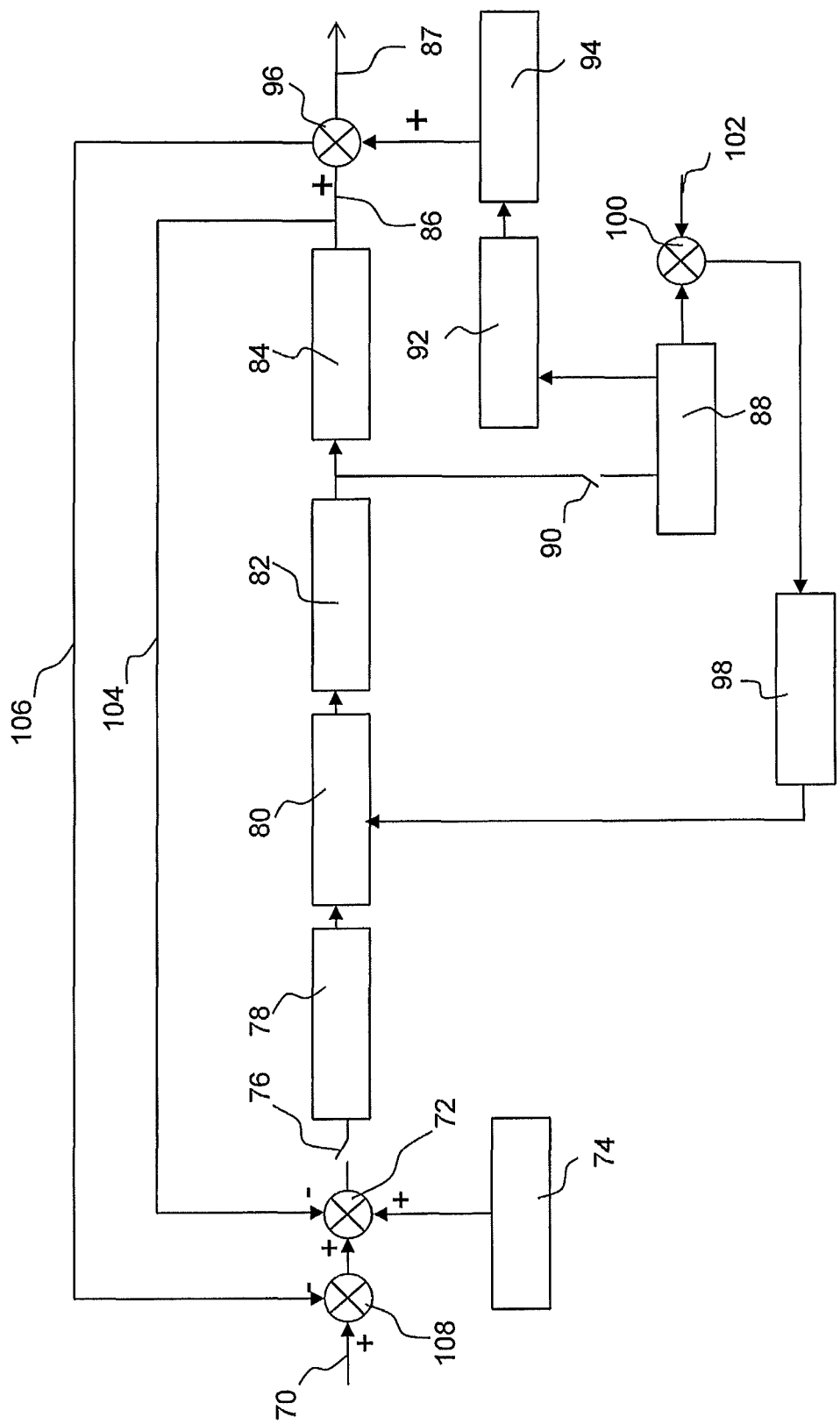
FIG. 2 is a schematic operational diagram of a landing aid apparatus for a rotary wing aircraft according to the invention.

Referring to FIG. 2, the pilot will observe a real world scene 70 along the line of sight of the pilot. As indicated by summation 72 a pilot's perception of the real world scene 70 is affected by sighting noise 74 due to movement of the aircraft being flown by the pilot and involuntary motion of the pilot's head. In operation, the landing aid apparatus includes an activation arrangement, for example a switch 76, which is operable by the pilot to capture the desired landing point for the aircraft, as determined by the line of sight of the pilot with respect to the real world scene 70. Accordingly, generated landing symbology is sighted by the pilot over the real world scene 70 in sighting process step 78, and in an error estimate process step 80 a calculation of error is determined for the position of the landing symbology with respect of the real world scene 70. The error calculation can include the position, velocity, altitude, heading or height of the aircraft or the errors associated with the tracker arrangement used to track the helmet and hence the line of sight of the pilot. Such tracker associated errors can include those due to distortion in the line of sight of the pilot caused by the optical effect of the cockpit canopy of the rotary wing aircraft.

Universal geographical coordinates for the desired landing point are calculated in coordinate generator process step 82 and the calculated universal geographical coordinates are used to generate landing symbology in symbology process step 84. The generated landing symbology is outputted at output 86 to be viewed by a pilot, who will observe a real world conformal display of ground referenced landing symbology overlaid on the real world scene 70 this providing a closed loop view of the errors within the landing aid apparatus.

A second output from coordinate generator process step 82, can be fed to a suitable sensor, such a steer radar section 88, via a switch 90. It will be understood that the steer radar 88 need only be used in certain environmental conditions, for example night flights and the switch 90 is either operable by the pilot or automatically in response to environmental conditions. The steer radar 88 provides data on the desired landing point, which is used to determine a map surface of the desired landing point in mapping process step 92. The mapping process step 92 output is used to create a synthetic representation of the surface of the desired landing point in synthetic display process step 94. The steer radar 88 output can be combined with a suitable database containing terrain and/or obstacle data to generate the synthetic representation of the surface of the desired landing point in synthetic display process step 94. The synthetic representation is combined with output 86 by a summation 96 such that a pilot will observe the synthetic representation of the scene and landing symbology overlaid on the real world scene at an output 87. Alternatively, the suitable sensor could be camera operating in the infra red spectrum and arranged to capture and generate a synthetic display to be observed by the pilot at output 87.

The steer radar 88 can also be used to measure the range to the desired landing point in ranging process step 98 and range information can be fed into the error estimate process step 80 to improve error estimates. As indicated by summation 100, determination of the range to the desired landing point will include measurement noise 102, that can be accounted for in the error estimate process step 80.

An error correctional feedback path 104 exists between the symbology process step 84, as output 86, back into the summation 72 to counter navigation and generated symbology placement errors and the sight noise 74 induced by aircraft motion. Furthermore, an overall validity feedback loop 106 is provided from the display symbology and synthetic image summation 96 to correct the real world scene 70 perceived by the pilot in summation 108.

Figure 3:
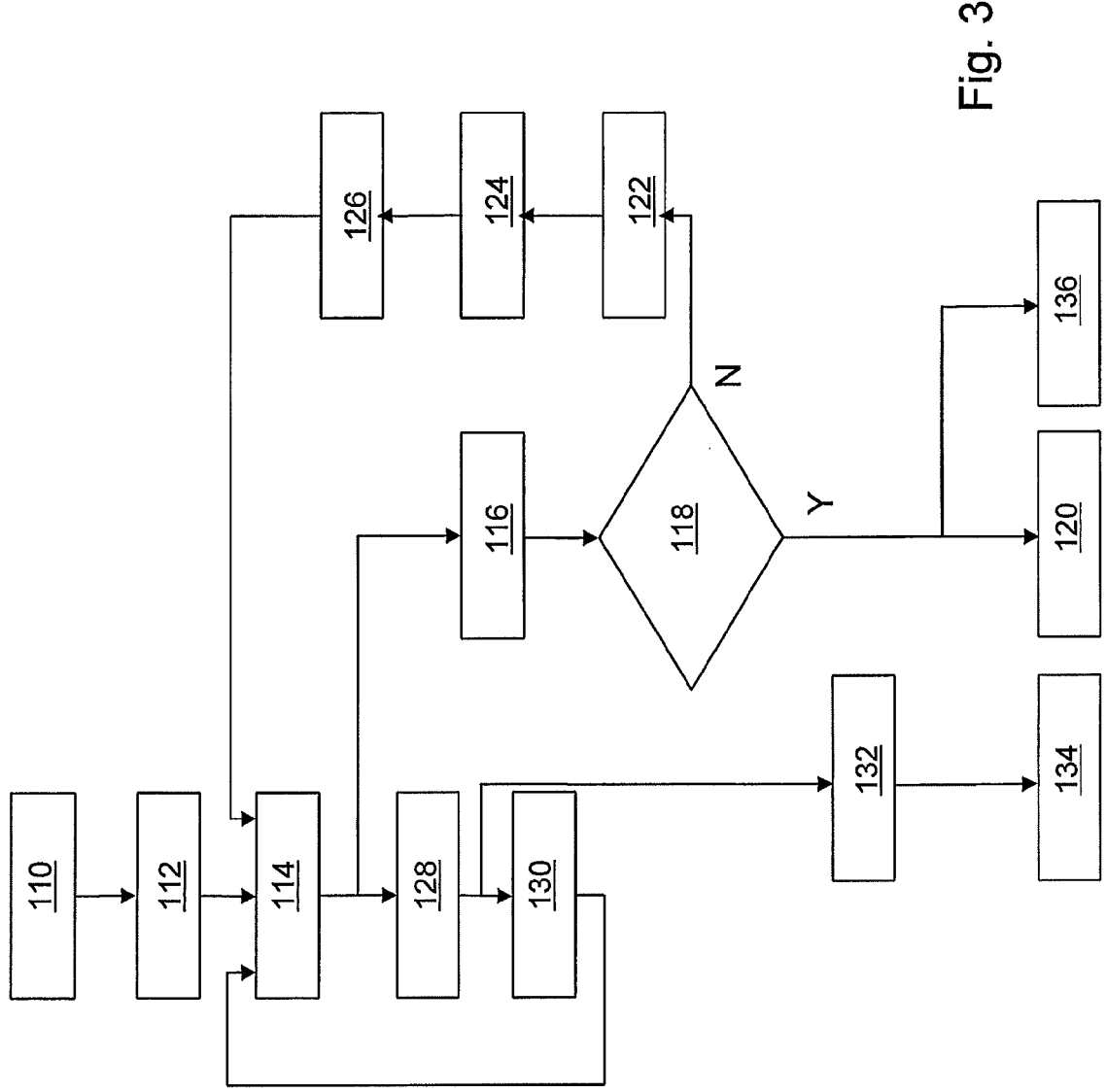
FIG. 3 is a flow diagram of a method for aiding landing of a rotary wing aircraft according to the invention.

Referring to FIG. 3, in operation the landing aid apparatus is used by a pilot to select a desired landing point at step 110, when the pilot utilizes the activation arrangement in order to capture the selected desired land point. When the activation arrangement has been activated the landing aid apparatus calculates the line of sight of the pilot at step 112 and hence can determine the desired landing point observed by the pilot.

The landing aid apparatus then makes a first calculation of the universal geographical coordinates for the desired landing point at step 114, the output of which is displayed as landing symbology on a display at step 116.

The pilot then observes the landing symbology overlaid on a real world scene and decides whether or not to accept the correlation between the calculated and displayed location of the desired landing point and the actual desired landing point at step 118. Should the pilot decide that the displayed landing symbology sufficiently correlates with the desired landing point then ground referenced landing symbology is displayed to the pilot at step 120 to enable the pilot to land should a brown out event occur. Otherwise, should the pilot decide that the calculated and displayed landing symbology does not sufficiently correlate with the desired landing point, then the pilot is able to steer the landing symbology at step 122 to re-designate the desired landing point such that the landing aid apparatus is able to calculate the error between the first attempt at calculation of universal geographical coordinates and the desired landing point at step 124, thereby enabling the calculation of corrections to the universal geographical coordinates at step 126, which are then fed back into the step 114. Step 114 then recalculates the universal geographical coordinates and re-displays the landing symbology to the pilot at step 116. The pilot can then reassess whether or not the applied corrections have established an acceptable correlation between the displayed landing symbology and the desired landing point at step 118. It will be understood that the pilot can continue to reject calculated and displayed landing symbology until the step 114 provides universal geographical coordinates that produce landing symbology which sufficiently correlates with the desired landing point at step 118. When the landing symbology is accepted at step 118, the ground referenced landing symbology is displayed to the pilot at step 120.

The universal geographical coordinates calculated at step 114 can also be used to steer a suitable sensor at step 128, for example a steer radar, which can produce range information from the present position of the aircraft to the desired landing point at step 130. The range information between the aircraft and the desired landing point can also be fed back to step 114 to be used in further calculations of the universal geographical coordinates at step 114.

Optionally, the sensor output at step 128 can be used to generate a synthetic scene at step 132 for display in step 134 of an enhanced image of the scene as observed by a pilot.

Furthermore, step 114 can also be used to calculate flight path symbology which are display to the pilot at step 136.

Figure 4:
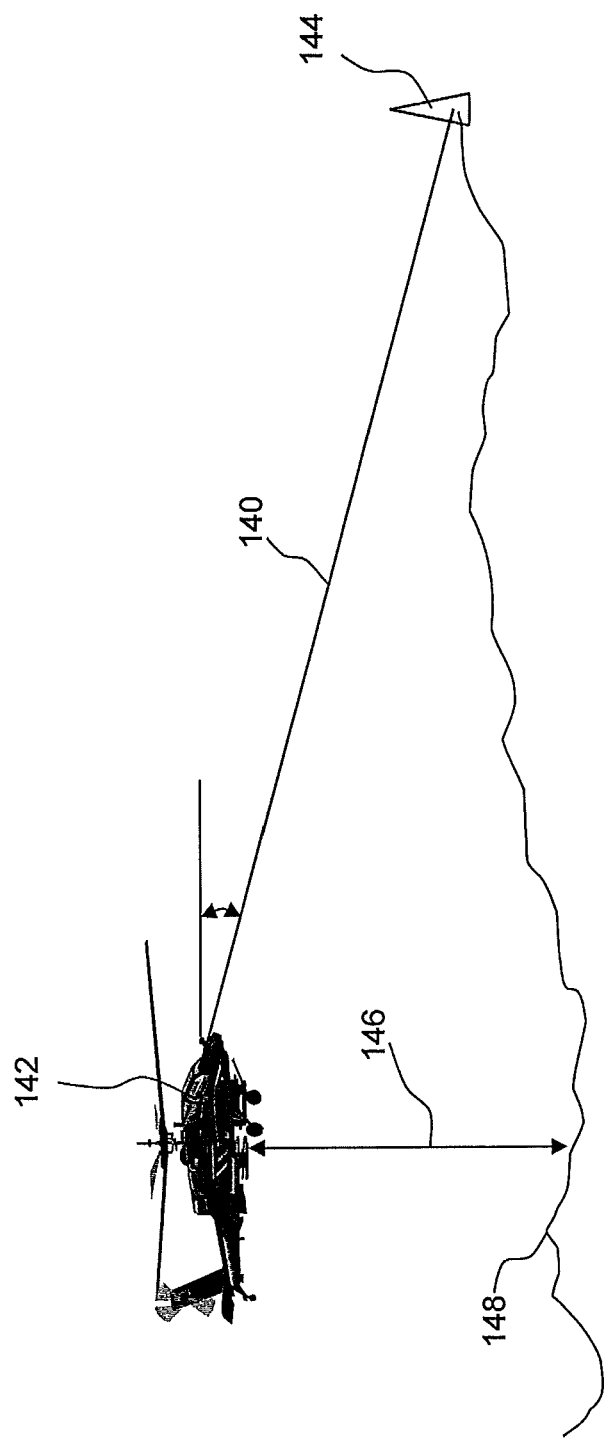
FIG. 4 is an illustration, in elevation, of use of a line of sight of a pilot to determine a desired landing point according to the invention.

Referring to FIG. 4, it will be understood that the line of sight 140 of a pilot of an aircraft 142 is used to determine the desired landing point 144 for the aircraft 142. The height 146 of the aircraft 142 above a given terrain 148 can be determined by a radar or radio altimeter. A terrain database can be utilised to counter act differences in terrain height between the aircraft position and the desired landing point. As the aircraft 142 will include a navigation arrangement to determine the location of the aircraft 142, the landing aid apparatus can determine the universal geographical coordinates for the desired landing point 144.

Referring to FIG. 5, an aircraft 160 is illustrated making a 360° overhead approach to a desired landing point 162 and follows a flight path 164 to a first designation point 166. At first designation point 166 the aircraft pilot sights and designates the desired landing point 162 by activating the landing aid apparatus when the line of sight of the pilot is directed to the desired landing point 162 to calculate first universal geographical coordinates for the desired landing point 162. The pilot will then review the displayed landing symbology generated by the landing aid apparatus and decide whether or not there is an acceptable correlation with the desired landing point 162. If not, the pilot will continue along the 360° overhead approach flight path 164 until a second designation point 168. Again, the pilot sights and designates the desired landing position 162 from an alternative location and activates the landing aid apparatus. The taking of a second designation from an alternative position reduces the designation error between the universal geographical coordinates calculated by the landing aid apparatus and the real world desired landing position 162 observed by the pilot.

The aircraft 160 can continue along the 360° overhead approach flight path 164 activating the landing aid apparatus at further designation points 170 and 172 to further reduce the designation error until the pilot is satisfied that the displayed landing symbology has an acceptable correlation with the real world desired landing point 162. At this point the pilot can then enter a landing phase of the flight and land the aircraft 160 at the desired landing point 162, even when the helicopter 160 enters a brown out event indicated by dust cloud 174.

Referring to FIG. 6, wherein like references have been used to indicate similar integers to those illustrated with reference to FIG. 5, the designation points 166, 168, 170 and 172 are indicated with respect to height along the ordinate axis 176 and with respect to time along the abscissa axis 178. As an aircraft approaches the desired landing point 162, the landing aid apparatus is arranged to calculate universal geographical coordinates at each designation point 166, 168, 170 and 172 to thereby display landing symbology which is correlated with the desired landing point 162 before the aircraft enters dust cloud 174.

Referring to FIG. 7, wherein like references have been used to indicate similar integers to those illustrated with reference to FIGS. 5 and 6, a designation error is indicated along the ordinate axis 180 for each designation point along the abscissa axis 182. The cumulative designation error for each designation point 166, 168, 170 and 172, as indicated by dotted line 184, improves with each activation of the aircraft landing aid by taking into account the probable uncertainties of the location of the designation point which will be a function of off-bore-sight angle, aircraft height uncertainty and the look down angle of the pilot from the aircraft to the desired landing point 162.

Referring to FIGS. 8, 9, and 10, wherein like references have been used to indicate similar integers to those illustrated with reference to FIG. 5, alternative approach patterns for an aircraft 160 approaching a desired landing point 162 are illustrated. The aircraft follows a flight path 164 and activation of the landing aid apparatus occurs at designation points 166, 168, 170 and 172 to provide landing symbology to a pilot before the aircraft 160 enters a brown out event indicated by dust cloud 174.

Preferably, the aircraft 160 will follow a flight path 164 in a manner to provide an improved designation error with each activation of the landing system at the next designation point 166, 168, 170 and 172.

FIG. 8, illustrates a 90° turn-in approach for the aircraft 160 following flight path 164 to the desired landing point 162.

FIG. 9, illustrates a 180° offset approach for the aircraft 160 following flight path 164 to the desired landing point 162.

FIG. 10, illustrates a straight in approach for the aircraft 160 following a flight path 164 to the desired landing point 162.

Figure 11:
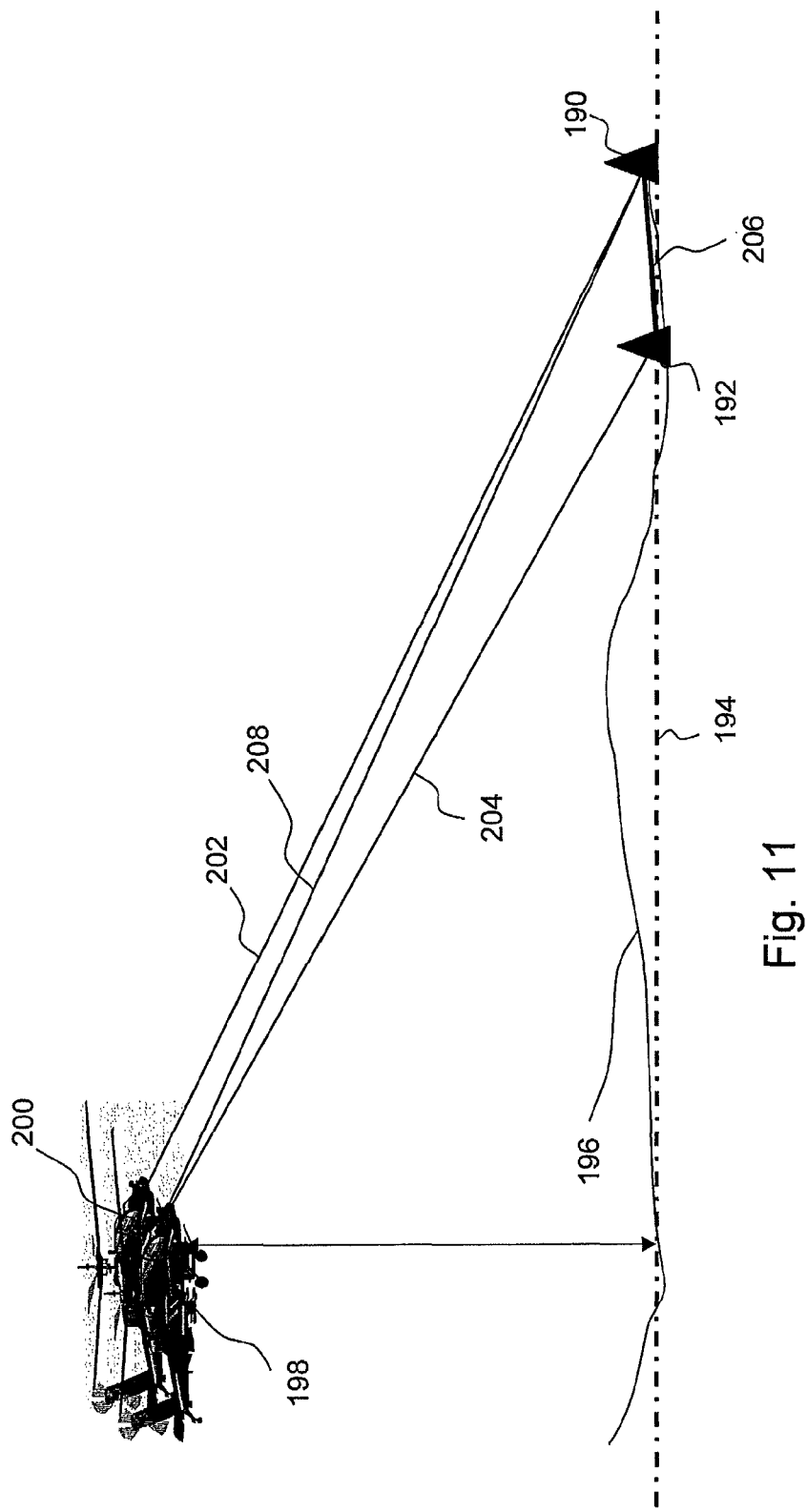
FIG. 11 is a schematic illustration, in elevation, of the cumulative effect of errors on a calculation of the desired landing point relative to the actual desired landing point according to the invention.

Referring to FIG. 11, there is an illustrated of the cumulative effect of errors in the calculation of the height of an aircraft, the position of the aircraft and the calculated sighting angle of the pilot for a calculated landing point 190 when compared to the desired landing point 192 viewed by the pilot. The landing aid apparatus uses a flat terrain model 194 of the real terrain 196 above which an aircraft 198 is flying. A radar altimeter on board the aircraft 198 determines the height of the aircraft 198 above the real terrain 197. This height determination is then used to create the flat terrain model 194. As is illustrated, the desired landing point 192 is in fact below the flat terrain model 194. Alternatively, a terrain database can be used to correct the determined height of the aircraft above the real terrain 197.

Furthermore, an inertial navigation system carried by the aircraft 198 provides an estimated aircraft height position 200, which in this case is some distance above the actual aircraft position 198. This results in the landing aid apparatus erroneously determining the line of sight of the pilot as that given by line of sight 202, when in fact the line of sight of the pilot is that of line of sight 204. This also results in an erroneous calculation of the sight angle of the line of the sight of the pilot. The result is that the first calculated landing point 190 is in fact displaced from the desired landing point 192 by a distance 206. Accordingly, when landing symbology is displayed to the pilot the calculated landing point 190 will not correlate with the desired landing point 192 and the calculated landing point 190 will appear to the pilot to be along a different line of sight 208.

An objective of the landing aid apparatus is to provide further calculations of the landing point 190 from different locations of the aircraft 198 so as to close the distance 206 between the desired landing point 192 and the next calculated landing point 190 to provide an acceptable correlation between the calculated landing point 190 and the desired landing point 192.

Figure 12:
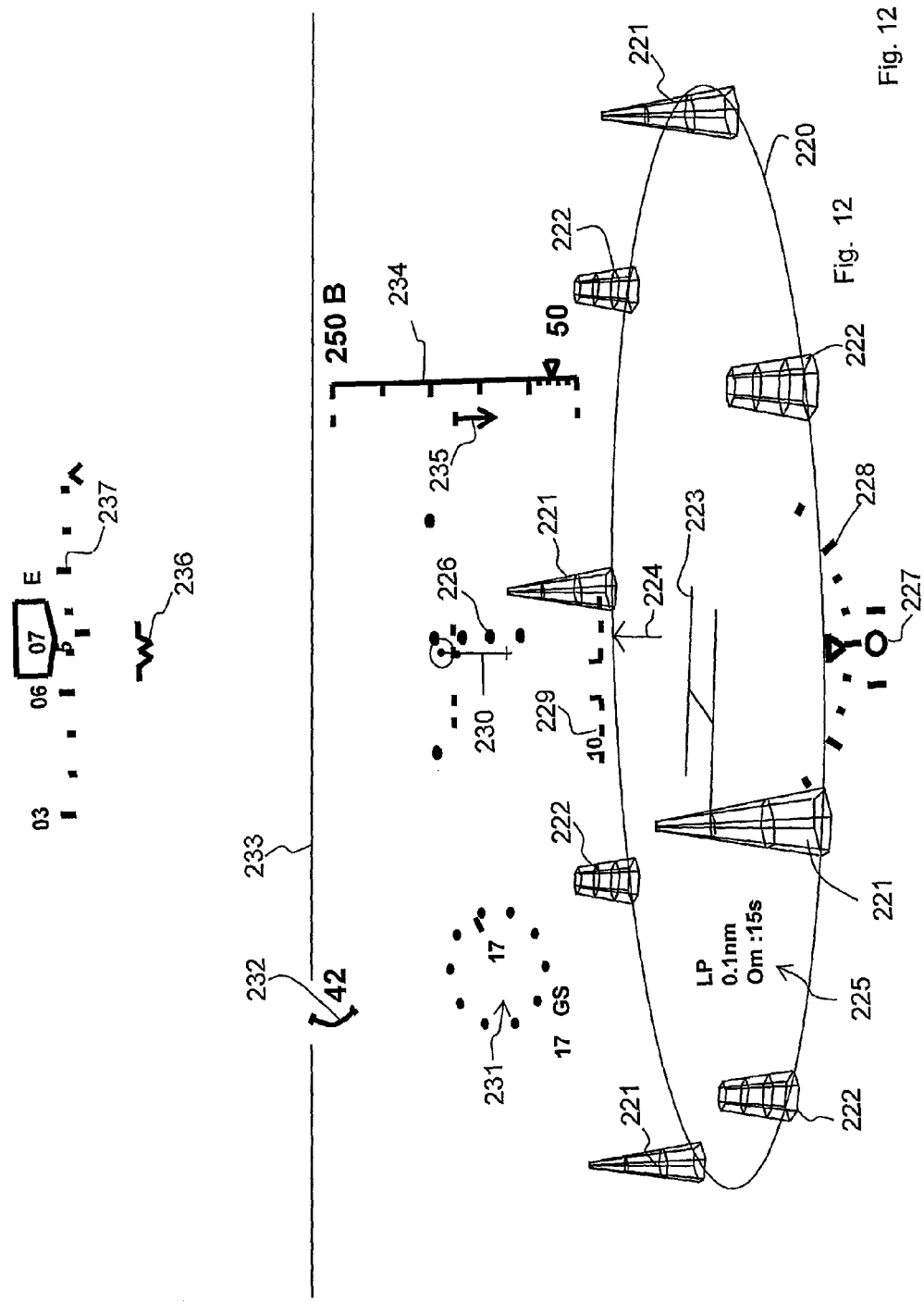
FIG. 12 is a view of the landing symbology displayed to a pilot of a rotary wing aircraft according to the invention.

Referring to FIG. 12, there is illustrated the conformal ground awareness landing symbology in conjunction with existing well known aircraft instrument symbology displayed to the pilot via a helmet mounted display. The landing symbology provides the pilot with cues regarding the condition of the aircraft with respect to the ground surface of the desired landing point that would be seen if the ground was visible to the pilot. The aircraft instruments symbology provide aircraft state information to enable the pilot to fly the aircraft without reference to internal cockpit instruments so as to maximise situation awareness of the outside world.

The landing symbology includes:

A circle 220 or other shape representing the safe clearance required for the aircraft, typically one and half times the rotor diameter of the aircraft. The circle 220 is centred at a position corresponding to the computed desired landing point and is aligned with the estimated ground surface;

Three dimensional markers 221, typically a pylon shape, two and a half meters in height and with one meter base diameter. Horizontal bands are provided on the markers 221 to indicate height, typically in 1 meter increments. The markers 221 are orientated at the cardinal points (North, East, South and West), or at another alignment chosen by the pilot, for example upwind or a tactical alignment, and are positioned on the circumference of the circle 220;

Markers 222 similar to marker 221, but of a reduced height, to provide indications of intermediate headings so as to reduce the amount of pilot head movement required to view the symbology when using a restricted field of view display device;

The circle 220 and associated markers 221 and 222 can be a complete circle, as illustrated, or may be broken, for example a semi-circle to provide an indication of a entry gate for the pilot, the pilot entering the desired landing area through the open part of the circle 220.

A standard H symbol 223 is used to indicate the centre point of the desired landing point. The H symbol 223 can be shaped, for example by sloping the lines together, not illustrated, to indicate North or the pilot desired alignment;

An arrow cue 224 represents the alignment of the aircraft longitudinal axis with respect to the desired landing point;

A display 225, typically in numerical format to indicate the distance between the aircraft and the desired landing point and the time required to reach the desired landing point at the current aircraft speed; and Indicator 226 placed on the computed ground surface, ahead of the circle 220, provides lateral and horizontal cues to the pilot of aircraft glide slope. This indicator 226 can be a representation of the standard NATO "T" or "Y" patterns.

The size of circle 220, markers 221 and 222 and H symbol 223 can provide visual indications of the distance between the aircraft and the desired landing point. The shape of circle 220, markers 221 and 222 and H symbol 223 can provide visual indications of the orientation between the aircraft and the desired landing point. Changing the size of circle 220, markers 221 and 222 and H symbol 223 provide visual indications of the closing rate between the aircraft and the desired landing point. The closing velocity, not illustrated, computed from a sensor, such as a radar, can also be indicated numerically.

A grid, not illustrated, can be superimposed upon or under the circle 220 to represent the ground surface, this grid can be derived from a flat earth model or a terrain database.

Additionally a ground surface representation derived from a senor such as a RADAR or LADAR can be displayed in conjunction with or independently from the grid to provide indications of detected obstacles.

Additionally airborne obstacles detected by a sensor can be represented within the display space to provide indications to the pilot of a potential hazard.

The existing aircraft instrument symbology includes:

Aircraft slip indicator 227;

Aircraft roll indicator 228;

Pitch bar indicator 229 showing the aircraft pitch angle;

Velocity and acceleration indicator 230 showing a plan view of the aircraft velocity and acceleration vectors with respect to the aircraft body;

Speed indicator 231 showing both air and ground speed;

Torque indicator 232;

Conformal horizon line 233 showing the computed horizon;

Height indicator 234 showing both radio altimeter derived height and barometric height;

Vertical velocity indicator 235;

A symbol 236 representing the aircraft body, aligned to the longitudinal axis of the aircraft; and An aircraft heading symbol 237 representing aircraft heading, track and the desired heading to achieve a selected waypoint or desired landing point. The carot, inverted "v", indicates the desired heading to waypoint or desired landing point.

Figure 13:
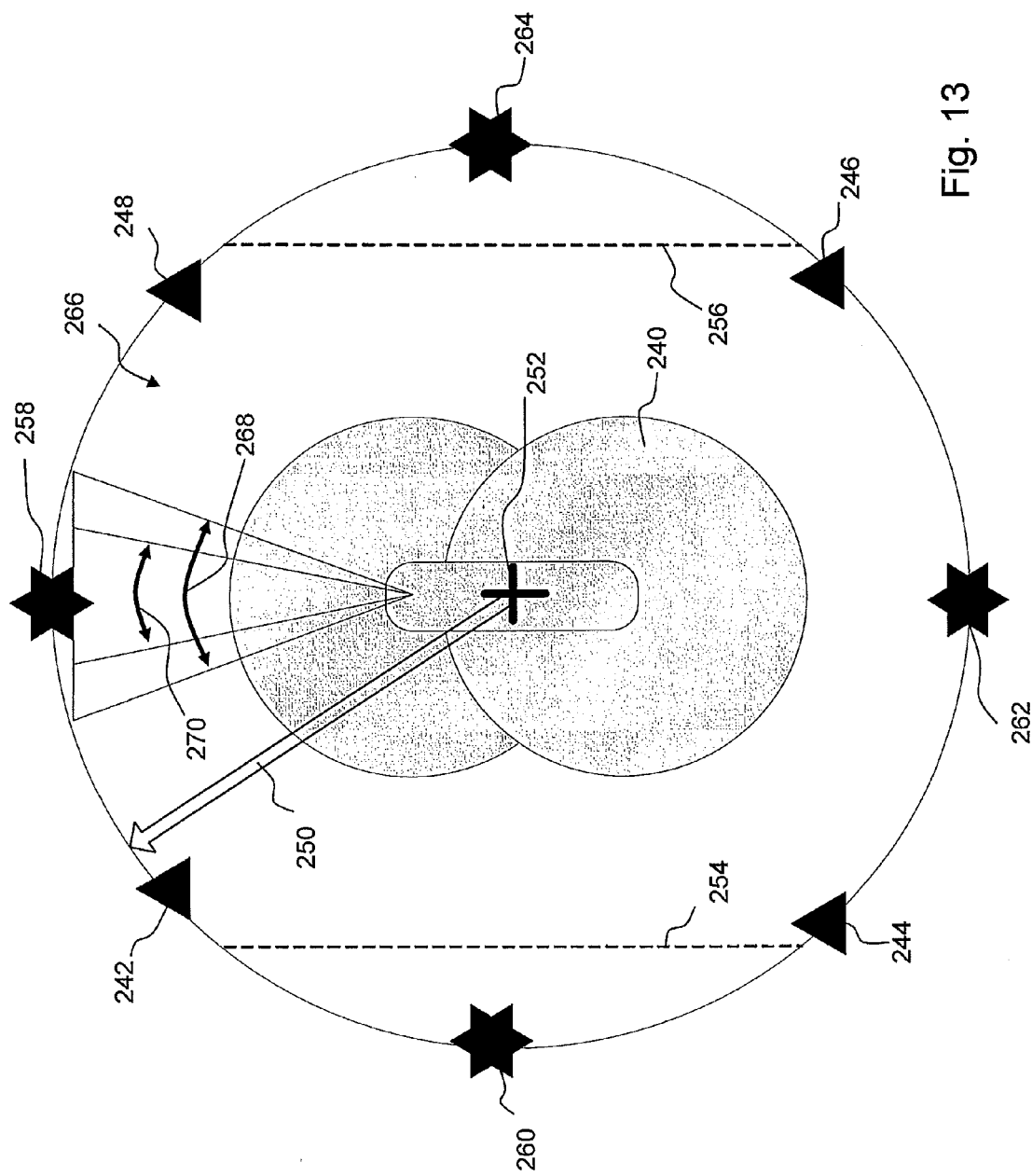
FIG. 13 is a plan view of the landing symbology displayed to a pilot relative to a landing footprint of a rotary wing aircraft according to the invention.

Referring to FIG. 13, a plan view of the landing symbology displayed to the pilot is illustrated relative to the landing footprint of an aircraft 240, for example a CH47 type aircraft, will have a ground footprint of approximately 30 meters by 18 meters. For this type of aircraft 240, safe landing symbology markers 242, 244, 246 and 248 displayed to the pilot of the aircraft 240 are provided at a safe landing radius 250 of approximately 23 meters from a central point 252 of the aircraft 240.

As indicated by dotted lines 254 and 256, there is an option for the landing aid apparatus to display symbology of a "clipped circle" safe landing markers for minimised side clearance so that the aircraft 240 can land beside other aircraft near the desired landing point.

Landing symbology markers 258, 260, 262 and 264 can also be displayed to the pilot to give further situational awareness of the position of the aircraft 240 relative to a safe landing area 266 and assist when only a limited field of view display device is available to convey landing symbology to the pilot. It will be understood that the pilot will have a limited field of view from the aircraft 240 for example, the field of view for night vision goggles is approximately 40° as indicated by angle 268, whereas the field of view of generated landing symbology will be approximately 20° as indicated by angle 270. Other fields of view can be used if available on a particular device employed to convey landing symbology to the pilot.

Referring to FIGS. 14 to 17, wherein like references have been used to indicate similar integers in each of these figures, there is shown a display 280 with landing symbology markers 282, 284, 286, 288 and 290 displayed to a pilot on the helmet mounted display. Also displayed is the direction of the aircraft as arrow cue 292 and an indication of the direction and lateral velocity of the aircraft as cue 294 and the magnitude of the lateral acceleration of the aircraft as chain cue 296.

Figure 14:
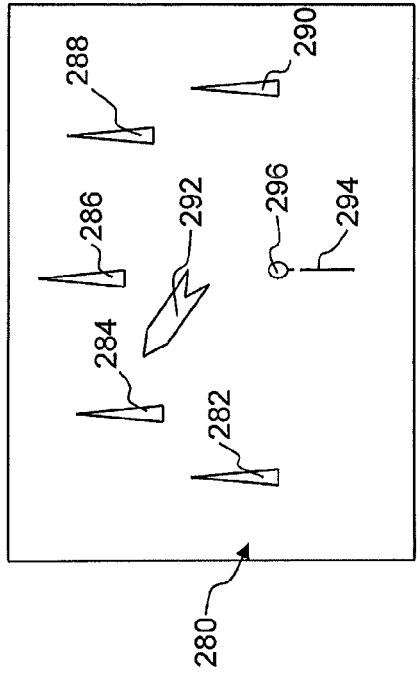
FIGS. 14 to 17 are views of the landing symbology displayed to a pilot of a rotary wing aircraft according to the invention.

FIG. 14 illustrates the display 280 for a rotary wing aircraft with forward velocity as indicated by cue 294, a small forward acceleration, as indicated by the length of the chain cue 296, and no lateral velocity or acceleration acting on the aircraft, as indicated by the vertical position of cues 294 and 296. There is a possibility that the pilot can become disorientated as to the relationship between the current line of sight of the pilot and the longitudinal axis of the rotary wing aircraft. This disorientation is commonly mitigated by addition of canopy markers or airframe markers displayed to the pilot on the helmet mounted display. However, arrow cue 292 of the present invention illustrated on the display 280 allows a pilot to maintain orientation within the limitations of the relatively small field of view of the display 280 without the additional burden of canopy markers or airframe markers being displayed on the helmet mounted display.

Arrow cue 292 shows the pointing angle of the longitudinal axis of the rotary wing aircraft with respect to the landing symbology markers 282 to 290. That is, the pilot is looking directly forward along the aircraft as shown by the vertical position of the cue 292 on the display 280. The vertical coincidence of the cues 292, 294 and 296 indicate the correct landing configuration for the rotary wing aircraft with no lateral velocity or acceleration on the rotary wing aircraft and the pilot is looking directly forward into the line of motion of the rotary wing aircraft.

Figure 15:
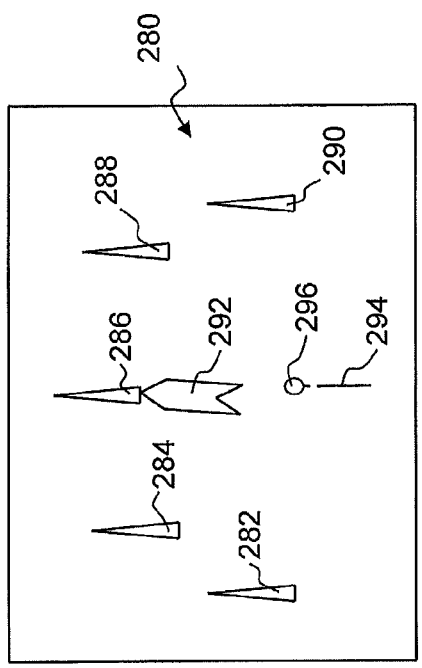

Referring to FIG. 15, the display 280 indicates that although there is a small forward velocity with no lateral components as indicated by the vertical position of cues 294 and 296 and the pilot is looking off to the left, arrow cue 292. Accordingly, there is a risk of disorientation of the pilot under heavily degraded visibility conditions occurring during a brown out.

Figure 16:
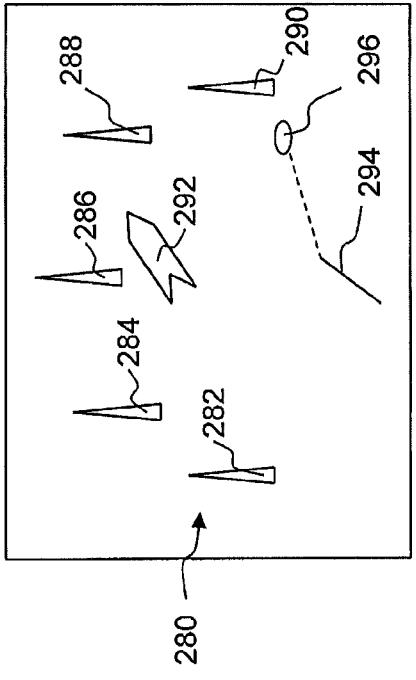

Referring to FIG. 16, the display 280 illustrates that the pilot is looking directly along the longitudinal axis of the rotary wing aircraft, as indicated by arrow cue 292, but that there is significant and increasing lateral velocity acting on the aircraft as indicated by cue 294, which is pointing to the right, and the length of the chain cue 296. This lateral velocity could cause the rotary wing aircraft to topple when ground contact is made during landing.

Figure 17:
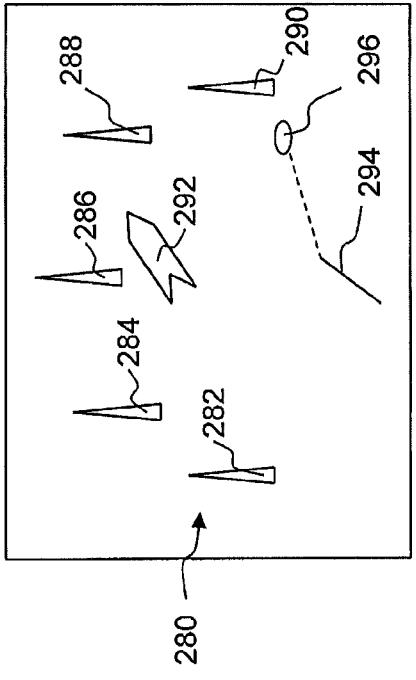

Referring to FIG. 17, the display 280 indicates that the pilot is looking right of the longitudinal axis of the aircraft, as indicated by arrow cue 292, and that there is significant and right velocity and acceleration as indicated by cue 294 and the length of chain cue 296. The is a high risk of disorientation and the lateral velocity could cause the rotary wing aircraft to topple when ground contact is made during landing.

FIGS. 15, 16 and 17 indicate an incorrect approach of the aircraft to the desired landing point and provide the pilot of the aircraft with information to adjust the attitude of the aircraft with respect to the markers 282 to 290. They also illustrate that observation away from the longitudinal axis of the aircraft is reported to the pilot via arrow cue 292.

Figure 18:
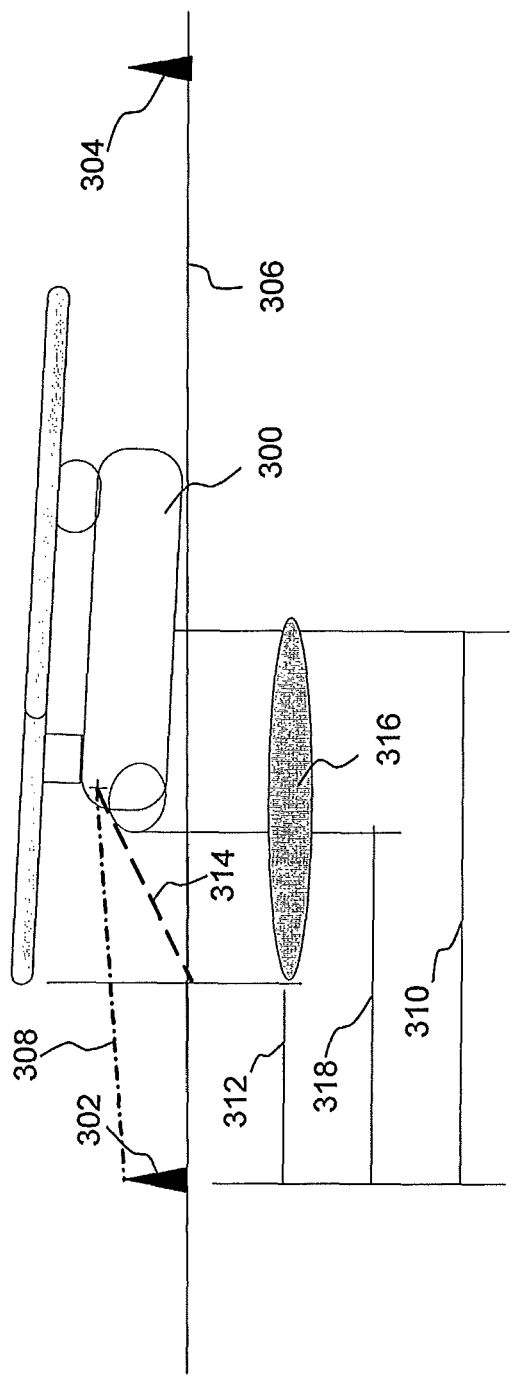
FIG. 18 is a side elevation view of a rotary wing aircraft which illustrates the blind spot of a pilot and landing symbology according to the invention.

Referring to FIG. 18, which illustrates a side elevation view of an aircraft 300 relative to landing symbology markers 302 and 304, from which it can be determined that the landing symbology markers 302 and 304 will need to be generated such that they are at least 2.5 meters high relative to terrain 306 and have a base of approximately one meter to be observable along a line of sight of the pilot 308 as the aircraft nears the terrain 306 during landing. Furthermore, the landing symbology markers 302 and 304 will need to be approximately 23 meters from a central position of the aircraft 300 as indicated by line 310, which will give a clearance between the markers 302 and 304 and the aircraft rotor of approximately eight meters as indicated by line 312. Also, the greatest look-down direction 314 inhibits the view of the pilot of the terrain 306 below the aircraft 300 as indicated by blind spot 316, which begins at approximately eight meters from the forward landing symbology marker 302. The nose of the aircraft 300 will be approximately positioned 16 meters from the marker 302 as indicated by line 318.

As several sightings of the desired landing point will be taken for different aircraft positions and tracker angles it is important to resolve, as far as possible, the errors for the different aircraft positions and tracker angles and to subsequently correct such errors into the correct components of the aircraft position and tracker angle. This can be achieved by resolving each error source into equivalent into northings, eastings, height, sight elevation and azimuth angles. Then an error model can be used to predict the likely tracker error and navigational uncertainties produced by the inertial navigation system in order to reduce such errors.

Consider the simplified case of an aircraft travelling along a track east whilst the pilot makes a sighting and designation north to a desired landing point X and where the landing aid apparatus computes the desired landing point to be at point A. To a first order, the error in the northing will be XA and will be caused by a combination of errors in the northing (En), height (Eh) and elevation sighting angle (Ese). Resolving these errors into their equivalent ground distances gives the likely ground distance error as the sum of the squares of the individual components, namely:

$$XA^2 = En^2 + Eh^2 + Ese^2.$$

As the likely ratio of the errors quantities are known as a function of range, sighting angle, tracker error model and estimated navigation uncertainties, the error revealed in the desired landing point designation by sighting and designation process can be computed and corrections applied to improve the accuracy of the landing aid apparatus. These corrections can be applied to the current sighting and designation and used as a form of calibration to improve the performance of subsequent sightings and designations. The simplified case described above for a single axis to can be applied to multiple axes. It will be understood that the sightings will be conducted for ranges which are operationally relevant to the landing aid apparatus and are likely to be used for ranges less than 2000 meters and heights of less than 150 meters.

The raw uncertainties for height are likely to be approximately 0.6 meters, approximately 10 meters for horizontal position and approximately 1° for sighting angle.

Therefore, the cumulative position error will be approximately 10 meters before correction for a height of approximately 30 meters with a look-down angle of 45°. For a desired final position error of the correction of less than 0.6 meters, a sighting error of equivalent to 0.66° is necessary. Accordingly, if an improvement factor of three of the source error estimates is provided for each iteration then one initial sighting is required and three subsequent corrections to give a terminal error of less than a 0.6 meters. Alternatively, if the improvement factor of five is achieved for the source error estimates in each iteration, then one initial sighting and two subsequent corrections are required to give better than a 0.6 meter terminal error.

As has been previously discussed, enhanced performance of the landing aid apparatus can be provided by use of an appropriate range finder to determine the range between the desired landing point and the aircraft. Furthermore, a ground mapping laser or a suitable radar can be used to measure the ground surface at the desired landing point prior to a brown out occurrence and a suitable radar used to provide further information to the pilot so that the pilot can avoid objects in the brown out cloud.

The brown out cloud is caused by dessert soils and loams ranging from a density of 2 microns to 50 microns. Clays are usually less than 2 microns, silts are usually between 2 and 50 microns and sands are usually greater than 50 microns. Similarly, vision can be lost when landing due to water, ice and/or snow droplets rising from the terrain and obscuring the vision of the pilot. Accordingly, it is possible to equip the landing aid apparatus with a suitable sensor, depending on the nature of the obscuration material, which is either active or passive, for example a steerable radar operating at millimetric frequencies, for example 92 Ghz, to provide situational awareness to the pilot of other objects whilst the aircraft is within the brown out cloud.

It will be noted that the desired landing point could be pre-programmed as the best available landing site in a given area for the aircraft prior to or during a flight of the aircraft. The correlation between calculated and displayed landing symbology and a desired landing point will be determined by the pilot of the aircraft as previously described. It is also possible that a processor could be used to determine an acceptable correlation factor between calculated landing symbology and the desired landing point, rather than rely on an acceptable visual correlation undertaken by the pilot. In this case, the landing aid apparatus would assume suitable designation points during the approach of the aircraft to a pre-programmed desired landing point.

Furthermore, if a suitable resolution database is available, for example from a laser scanned survey, than a suitable processor could correlate aircraft sensor returns against that database to both improve the overall navigation accuracy and to accurately locate the desired landing point against significant features contained in that database. Such features could include small objects such as boulders, ditches and other surface texture detail capable of causing damage to the rotary wing aircraft as well as other larger objects such as pylons and associated wires.

Although the helmet tracker arrangement 20, 22 and 24 of FIG. 1 indicates that sensors 20 and 22 are fixed to the aircraft frame and used to track motion of the helmet 12 that has a number of associated emitter devices attached thereto, not illustrated, it will be understood that there are a number of other methods and apparatus for tracking such a helmet 12 and which could be introduced into the landing aid apparatus 10.

The navigation arrangement 34 of FIG. 1 can also be arranged to provide orientation and velocity information for the aircraft, which can be displayed to the pilot via the helmet mounted display.

It will be noted that the landing aid system in a simple form can operate in a relative manner if the position of the aircraft is unknown. The landing aid apparatus will compute the desired landing point relative to the rotary wing aircraft and due consideration given to line of sight errors. This is useful for aircraft that do not have navigation apparatus or when such navigation apparatus are not available.

The night vision goggles 14 and the helmet mounted display 13 illustrated in FIG. 1 can be combined into a day and night vision goggles.

The landing aid apparatus can be used in twin aircrew cockpit operated rotary wing aircraft. Many helicopters, Chinook, Merlin, Lynx, Blackhawk, etc., are two aircrew operated. Restricted visibility landing is typically accomplished by mutual co-operation between the two aircrew. For example, one aircrew member, the pilot, will operate the rotary wing aircraft controls and maintain a watch on external references outside the cockpit, while the other aircrew member monitors aircraft instruments within the cockpit and calls out important parameters such as height and speed to assist the pilot and thereby to keep the rotary wing aircraft safe.

Additionally, in severe degraded visibility conditions where only one aircrew member has view of the external references at any one time, then control of the aircraft will be passed between aircrew based on the best visibility of external references. Generally, control always rests with the aircrew who has best view of the external references.

Furthermore, a third crew member, if available, will attempt to maintain visual contact with the ground directly underneath the rotary wing aircraft, typically by looking out of an open door, and call distances to contact with the ground to the pilot.

The present invention combines landing symbology and aircraft instrument symbology on a helmet mounted display, thus reducing pilot workload by eliminating the need for second aircrew to call out aircraft parameters from internal cockpit instruments. Additionally both aircrew have access to the same information set for the desired landing point landing symbology and aircraft instrument symbology enabling both aircrew to monitor external references, whilst cooperatively working to maintain a common situation awareness.

Once calculated the desired landing point can be displayed on a map, photograph or a similar representation of the area of interest to assist the aircrew in assessing the suitably of the location for landing or other purposes to provide wider area situation awareness. Equally it may be transmitted by radio to cooperating elements to indicate the intention of the pilot and resolve potential conflicts with the other element. These elements could include ground forces or other rotary wing aircraft attempting to land in the same area as the desired landing point.

The activation arrangement can also include a means to modify a desired landing point, to set the orientation of the landing symbology to North, to wind align the rotary wing aircraft or to provide a tactical heading for the rotary wing aircraft. The activation arrangement can also be capable of deleting, storing or recalling a desired landing point.

Figure 19:
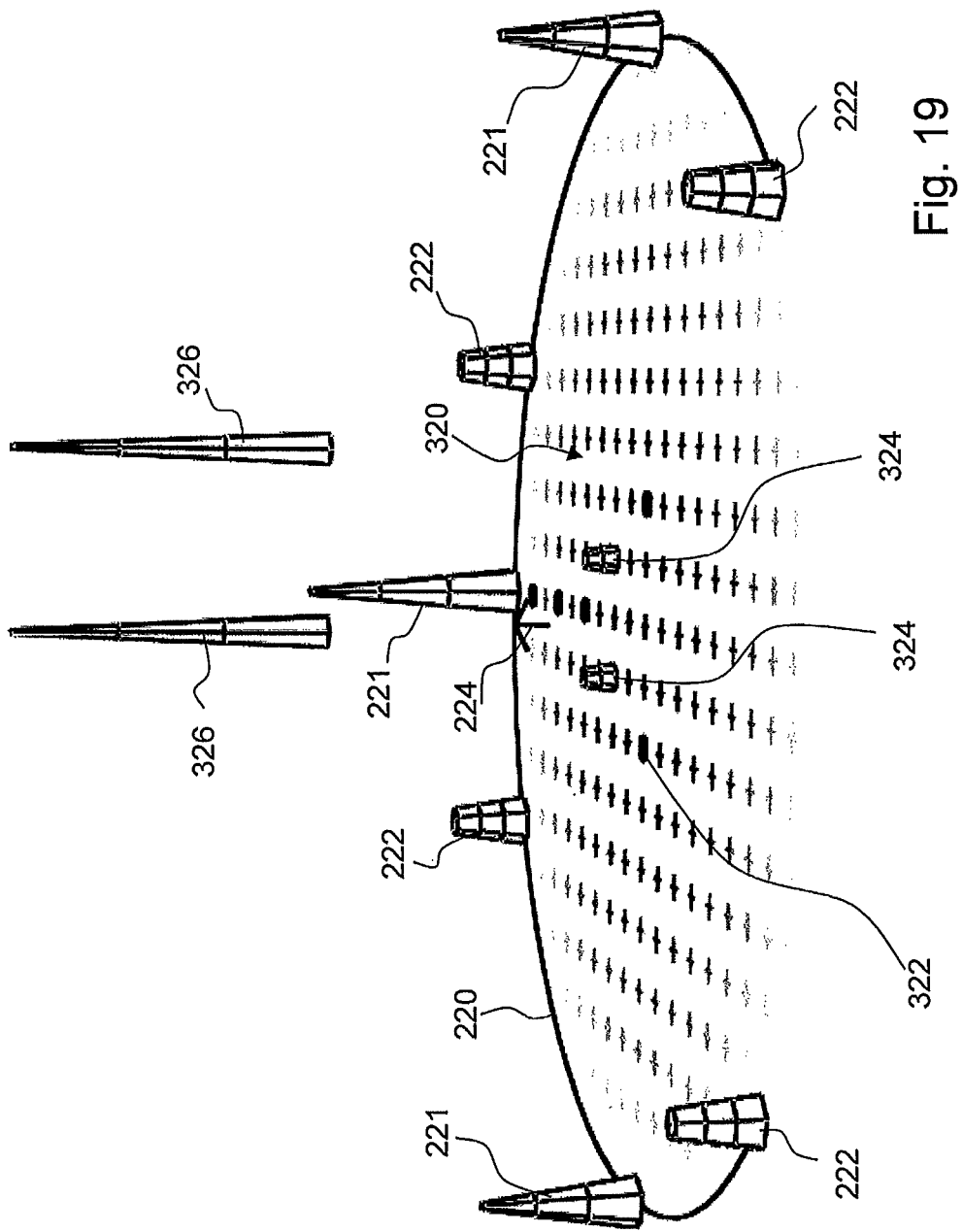
FIG. 19 is a partial view of an alternative landing symbology layout displayed to a pilot of a rotary wing aircraft according to another aspect of the invention.
Figure 20:
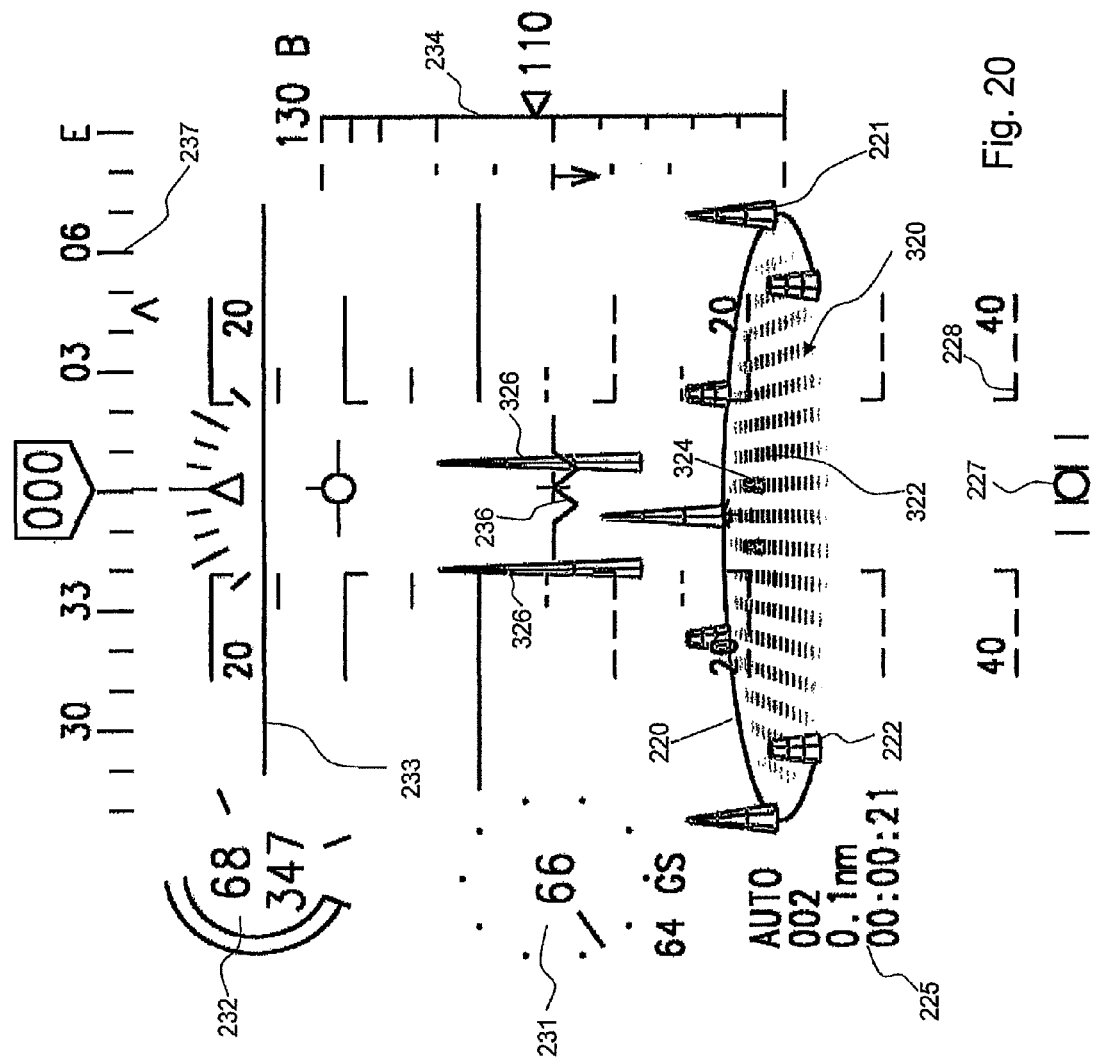
FIG. 20 is a view of the alternative landing symbology layout of FIG. 20 with the addition of existing instrument symbology.

Referring to FIGS. 19 and 20, wherein like referenced have been used to indicate similar integers to those described with reference to FIG. 12, there is illustrated an alternative conformal ground awareness landing symbology, including further feature, (see FIG. 19) and the alternative conformal ground awareness landing symbology in conjunction with existing well known aircraft instrument symbology (see FIG. 20) as displayed to a pilot via a helmet mounted display. Again, the landing symbology provides the pilot with cues regarding the condition of the aircraft with respect to the ground surface of the desired landing point that would be seen if the ground was visible to the pilot. The aircraft instruments symbology provide aircraft state information to enable the pilot to fly the aircraft without reference to internal cockpit instruments so as to maximise situation awareness of the outside world.

Referring to FIG. 19, which partial illustrates the landing symbology for clarity, the alternative landing symbology further includes:

A grid 320 superimposed upon or under the circle 220 arranged to represent the ground surface of the landing point and can be derived from a flat earth model or a terrain database. Additionally a ground surface representation derived from a senor such as a RADAR or LADAR can be displayed in conjunction with or independently from the grid 320 to provide indications of detected obstacles about the landing point. Additionally airborne obstacles detected by a sensor can be represented within the display space to provide indications to the pilot of a potential hazard. The grid 320 provides a pilot with an view of the surface contours at and around the landing point.

A standard NATO "Y" 322 arranged to indicate the centre point of the circle 220 at desired landing point.

A pair of three dimensional markers 324, typically cone shaped, arranged on the NATO "Y" 322 to provide a pilot with a view of the location and orientation of the NATO "Y" 322 with respect to the aircraft; and A pair of three dimensional markers 326 or distal towers arranged outside the circle 220 to provide a pilot with perspective as to the orientation of the aircraft with respect to the circle 220.

Referring to FIG. 20, the alternative conformal ground awareness landing symbology and existing well known aircraft instrument symbology is illustrated.

The invention claimed is:

1. A tangible computer readable medium containing a computer program for causing a computer to execute a method for aiding landing of a rotary wing aircraft in reduced visibility, the computer program containing instructions which upon execution will cause a computer to:
   establish the location of a landing point with respect to the rotary wing aircraft based on data regarding a pilot's line of sight; and
   generate a synthetic representation of the landing point as a synthetic scene along the line of sight of the pilot and display the synthetic scene on a head mounted display, the synthetic representation comprising simulated three dimensional conformal symbology representative of three dimensional markers fixed relative to the landing point.

2. A tangible computer readable medium as claimed in claim 1, wherein the computer program will cause a computer to:
   determine a change in location of the rotary wing aircraft and a change in the line of sight with respect to the desired landing point; and
   change a configuration of the symbology displayed on the display along the line of sight such that it is conformal with the determined change in location.

3. The tangible computer readable medium as claimed in claim 1, wherein the landing symbology provides cues regarding a condition of the aircraft with respect to a ground surface of the landing point that would be seen if the ground surface were visible to the pilot.

4. The tangible computer readable medium as claimed in claim 1, wherein a configuration of the symbology comprises size and orientation of the markers which change to simulate the aircraft's rate and direction of approach to the landing site.

5. The tangible computer readable medium as claimed in claim 1, wherein the markers are located around the landing point and define a safe clearance for the aircraft without impact between rotary wings of the aircraft and landing point objects.

6. The tangible computer readable medium as claimed in claim 1, wherein the markers define at least part of a circle around the landing point.

7. The tangible computer readable medium as claimed in claim 1, comprising:
   determining a ground surface at the landing point and locating the markers in accordance with the determined ground surface.

8. The tangible computer readable medium as claimed in claim 1, wherein the markers comprise pylons having simulated width, depth and height.

9. The tangible computer readable medium as claimed in claim 1, wherein the markers are angularly spaced one from another about the landing point to provide geographical headings.

10. The tangible computer readable medium as claimed in claim 1, wherein the markers have dissimilar heights to distinguish one marker from another marker.

11. The tangible computer readable medium as claimed in claim 1, wherein at least two of the markers are spaced apart sufficiently to allow an entry gate for the aircraft to the landing point.

12. The tangible computer readable medium as claimed in claim 1, wherein the symbology comprises:
   at least one marker tower having a relatively large simulated height and arranged distal from other markers to provide perspective as to aircraft orientation with respect to the other markers when the aircraft is at an altitude above the simulated height of the other markers.

13. A display, controllable by a computer, for aiding landing of a rotary wing aircraft in reduced visibility, the display comprising:
   a representation of a desired landing point location with respect to the rotary wing aircraft along a line of sight of a pilot; and
   a synthetic representation comprising simulated three dimensional conformal symbology representative of three dimensional markers fixed relative to the landing point as landing aids.

14. The display of claim 13, configured as a head mounted display for a pilot, the display comprising:
   a change in location of the rotary wing aircraft and a change in the line of sight with respect to the desired landing point; and
   a change to the configuration of the symbology displayed along the line of sight such that it is conformal with the change in location.

15. The display of claim 13, wherein the landing symbology provides pilot cues regarding a condition of the aircraft with respect to a ground surface of the landing point that would be seen if the ground surface were visible to the pilot.

16. The display of claim 13, wherein a configuration of the symbology comprises size and orientation of the markers which change to simulate aircraft rate and direction of approach to the landing site.

17. The display of claim 13, wherein the markers are located around the landing point and define a safe clearance for the aircraft without impact between rotary wings of the aircraft and landing point objects.

18. The display of claim 13, wherein the markers comprise pylons having simulated width, depth and height.

19. The display of claim 13, wherein the markers are angularly spaced one from another about the landing point to provide geographical headings, wherein the markers have dissimilar heights to distinguish one marker from another marker.

20. The display of claim 13, wherein the symbology comprises:
   at least one marker tower having a relatively large simulated height and arranged distal from other markers to provide perspective as to aircraft orientation with respect to the other markers when the aircraft is at an altitude above the simulated height of the other markers.

* * * * *